(12) United States Patent
Trautenberg

(10) Patent No.: US 8,473,210 B2
(45) Date of Patent: Jun. 25, 2013

(54) METHOD FOR THE TRANSMISSION OF ADDITIONAL DATA ALONG WITH NAVIGATION MESSAGES IN A SATELLITE NAVIGATION SYSTEM

(75) Inventor: Hans L. Trautenberg, Cologne (DE)

(73) Assignee: Astrium GmbH, Taufkirchen (DE)

( * ) Notice: Subject to any disclaimer, the term of this patent is extended or adjusted under 35 U.S.C. 154(b) by 194 days.

(21) Appl. No.: 12/808,096

(22) PCT Filed: Dec. 15, 2008

(86) PCT No.: PCT/DE2008/002069
§ 371 (c)(1),
(2), (4) Date: Jun. 14, 2010

(87) PCT Pub. No.: WO2009/076936
PCT Pub. Date: Jun. 25, 2009

(65) Prior Publication Data
US 2010/0262369 A1    Oct. 14, 2010

(30) Foreign Application Priority Data

Dec. 14, 2007 (DE) ......... 10 2007 060 901
Dec. 11, 2008 (DE) ......... 10 2008 061 321

(51) Int. Cl.
*G01C 21/24* (2006.01)
(52) U.S. Cl.
USPC ......... 701/531; 701/400; 701/412; 701/468; 701/530

(58) Field of Classification Search
USPC .................. 701/400, 412, 468, 530, 531
See application file for complete search history.

(56) References Cited

U.S. PATENT DOCUMENTS

| | | | | |
|---|---|---|---|---|
| 5,153,598 A * | 10/1992 | Alves, Jr. | ....................... | 342/352 |
| 6,297,770 B1 * | 10/2001 | Ueda et al. | ............... | 342/357.62 |
| 6,424,285 B1 * | 7/2002 | Perdue et al. | ................. | 341/176 |
| 6,944,534 B2 * | 9/2005 | Trautenberg | .................. | 701/469 |
| 7,043,265 B2 * | 5/2006 | Nir et al. | ........................ | 455/502 |
| 7,570,203 B2 * | 8/2009 | Trautenberg | ............. | 342/357.45 |
| 7,747,257 B2 * | 6/2010 | Zhao et al. | ................. | 455/456.1 |
| 7,778,775 B2 * | 8/2010 | Okada et al. | .................. | 701/469 |
| 8,294,611 B2 * | 10/2012 | Trautenberg | ............. | 342/357.39 |
| 2002/0186165 A1 * | 12/2002 | Eschenbach | ............. | 342/357.15 |

(Continued)

FOREIGN PATENT DOCUMENTS

DE    102005039807 A1    3/2007
WO    WO 03040749 A1    5/2003

OTHER PUBLICATIONS

European Patent Office, International Search Report in International Patent Application No. PCT/DE2008/002069 (Jun. 26, 2009).

*Primary Examiner* — James Trammell
*Assistant Examiner* — Truc M Do
(74) *Attorney, Agent, or Firm* — Leydig, Voit & Mayer, Ltd.

(57) ABSTRACT

A method for transmitting additional information in a satellite navigation system includes providing a navigation message having a plurality of parameters, selecting at least one parameter from the plurality of parameters for the transmitting of the additional information, replacing the at least one parameter, at least partially, by the additional information so as to form a changed navigation message, and sending the changed navigation message.

9 Claims, 2 Drawing Sheets

U.S. PATENT DOCUMENTS

| | | | |
|---|---|---|---|
| 2003/0040869 A1* | 2/2003 | Nir et al. | 701/214 |
| 2004/0248559 A1* | 12/2004 | Trautenberg | 455/412.1 |
| 2005/0190102 A1* | 9/2005 | Hsu et al. | 342/357.02 |
| 2005/0278116 A1* | 12/2005 | McBurney et al. | 701/213 |
| 2006/0238418 A1* | 10/2006 | Monnerat et al. | 342/357.09 |
| 2007/0165677 A1* | 7/2007 | Monnerat et al. | 370/509 |
| 2008/0111739 A1* | 5/2008 | Rotman et al. | 342/357.15 |
| 2008/0284647 A1* | 11/2008 | Oren et al. | 342/357.09 |
| 2009/0119002 A1* | 5/2009 | Krueger et al. | 701/200 |
| 2010/0194634 A1* | 8/2010 | Biacs et al. | 342/357.09 |

* cited by examiner

METHOD FOR THE TRANSMISSION OF ADDITIONAL DATA ALONG WITH NAVIGATION MESSAGES IN A SATELLITE NAVIGATION SYSTEM

CROSS REFERENCE TO PRIOR APPLICATIONS

This application is a U.S. National Phase application under 35 U.S.C. §371 of International Application No. PCT/DE2008/002069, filed on Dec. 15, 2008 and claims benefit to German Application Nos. 10 2007 060 901.0, filed Dec. 14, 2007, and 10 2008 061 321.5, filed Dec. 11, 2008. The International Application was published in German on Jun. 25, 2009 as WO 2009/076936 under PCT Article 21 (2).

FIELD

The invention relates to a method for transmitting additional information with navigation messages in a satellite navigation system.

BACKGROUND

Satellite systems for worldwide navigation (Global Navigation Satellite System GNSS, satellite navigation system for short) are used for position determination and navigation on the ground and in the air. In order for a receiver to determine a given position, navigation messages are transmitted in the GNSS via the satellite signals. These navigation messages contain, among other things, data about the orbit of the satellite that is sending the satellite signal containing the messages. The messages are transmitted at certain time intervals in order to transmit the most current orbit data possible to receivers so as to attain precise position determination. In the European GNSS Galileo (below also referred to as the Galileo system or Galileo for short), which is being set up at this time, the current specification makes use of the following parameters for the orbit description in a navigation system:

$M_0$: mean anomaly at reference time
$\Delta n$: mean motion difference from computed value
$e$: eccentricity
$A^{1/2}$: square root of the semi major axis
$OMEGA_0$: longitude of ascending node of orbital plane at weekly epoch
$i_0$: orbit inclination angle at reference time
OMEGA: argument of perigee
OMEGADOT: rate of change of longitude of the ascending node at the weekly epoch
IDOT: rate of change of inclination angle
cuc: amplitude of the cosine harmonic correction term to the argument of latitude
cus: amplitude of the sine harmonic correction term to the argument of latitude
crc: amplitude of the cosine harmonic correction term to the argument of latitude
crs: amplitude of the sine harmonic correction term to the orbit radius
cic: amplitude of the cosine harmonic correction term to the angle of inclination
cis: amplitude of the sine harmonic correction term to the angle of inclination
$t_{0e}$: ephemeris reference time However, the navigation message for Galileo only provides for very few bits for future expansions, which of course limits any later expansion of the Galileo system by new services and additional information.

SUMMARY OF THE INVENTION

Therefore, an aspect of the present invention is to provide a method for transmitting additional information with navigation messages in a satellite navigation system.

In an embodiment of the invention, some or many parameters of a navigation message are replaced at least partially by information that has to be additionally transmitted. For example, additional information that, as a rule, does not have to have anything to do with the orbital parameters contained in a navigation message can be transmitted instead of some parameters of a navigation message or else can be transmitted in the least significant places of these parameters. In this manner, additional information, for example, for new system services, can be elegantly transmitted without having to substantially change the fundamental specification of a navigation message.

According to an embodiment, the invention now relates to a method for transmitting additional information with navigation messages in a satellite navigation system, whereby a navigation message has one or more parameters, said method comprising the following steps:

selecting at least one parameter of a navigation message for the transmission of the additional information,
at least partially replacing the selected, at least one, parameter by the additional information and
sending the navigation message that has been thus changed.

Such a method can be implemented, for example, in the form of an algorithm in a ground station of the satellite navigation system, and it can enable the introduction of new services without having to change the navigation message structure.

According to another embodiment of the invention, a parameter containing orbital data of a satellite of the satellite navigation system can be selected as the at least one parameter. In this manner, the orbital parameters contained in a navigation message are changed, but this can be done in such a manner that a utilizing system of navigation messages hardly notices the error introduced by the change.

In another embodiment of the invention, the satellite navigation system is the Galileo system and, as the parameters, one or more of the following parameters are selected: cuc; cus; crc; cic; cis; OMEGADOT; IDOT. These parameters at least at times contain orbital parameters and are suitable for the transmission of the additional information since the error introduced by this information can either be kept small, or at least can be compensated for by, for instance, subsequent unchanged navigation messages.

In particular, according to an embodiment of the invention, the least significant places of the selected, at least one, parameter can be replaced by additional information. The least significant places can be, for example, LSBs (Least Significant Bits) of a parameter. However, they can also be entire bytes or words of a parameter comprising several bytes or words, insofar as these entire bytes or words are the least significant places of the parameter.

According to another embodiment of the invention, the period of validity of a changed navigation message can be reduced in comparison to the period of validity of an unchanged navigation message in such a way that the changed navigation message fulfills the requirements of the satellite navigation system in terms of precision, integrity and/or continuity. The changed message can be sent, for example, more frequently than an unchanged message. The period of validity of a changed message can be reduced, for example, in such a way that it is still longer than the time until (for example) the at least next but one repetition of the navigation message in the sent data stream of a satellite, which is typically in the order of magnitude of a few minutes, and does not, for example, reach the 110 minutes that are currently provided for in the Galileo system.

Moreover, according to an embodiment of the invention, the unchanged parameters of a changed navigation message can each be defined in such a way that deviations in the orbit of the changed navigation message and in the corresponding unchanged navigation message during the reduced period of validity are sufficiently small. For instance, after a change of a few parameters containing orbital data through the insertion of additional information, the other parameters containing orbital data can be adapted to the changes in such a way that the total error that is caused by the additional information that is to be transmitted remains as small as possible due to the orbital data transported by the navigation message.

In an embodiment, the invention also relates to a satellite navigation system that comprises a space segment with several satellites that send satellite signals containing navigation messages that are to be received and evaluated by utilizing systems for position determination and navigation, and that comprises a ground segment with several observation and command stations that monitor the satellites, whereby one or more of the observation and command stations are configured to carry out a method according to the invention and, as described above, to transmit additional information to the utilizing systems. In such a satellite navigation system, additional information can be transmitted without fundamental changes in the structure or without a new definition of the navigation messages.

Moreover, one embodiment of the invention provides a method for receiving additional information transmitted by a method according to the invention as described above, said method having the following steps:
receiving a changed navigation message and
ascertaining the additional information contained in at least one parameter of the received changed navigation message. Such a method can be implemented, for example, in the form of an algorithm.

Finally, in another embodiment, the invention provides a receiver for signals from a satellite navigation system, said signals containing navigation messages, whereby the receiver is configured for executing a method for receiving additional information transmitted by a method according to the invention as explained above. For example, the method can be implemented in the operating software of a receiver for navigation messages, for example, a navigation device. In this manner, the functionality of the receiver can be expanded in that the additional information is processed in the receiver, for example, in that new services of the satellite navigation system are integrated into the receiver through the additional information.

BRIEF DESCRIPTION OF THE DRAWINGS

Additional advantages and application possibilities of the present invention ensue from the description below in conjunction with the embodiments shown in the drawings.

In the description, in the claims, in the abstract and in the drawings, the terms and associated reference numerals cited below in the list of reference numerals are used.

The drawings show the following:

Figure 1:
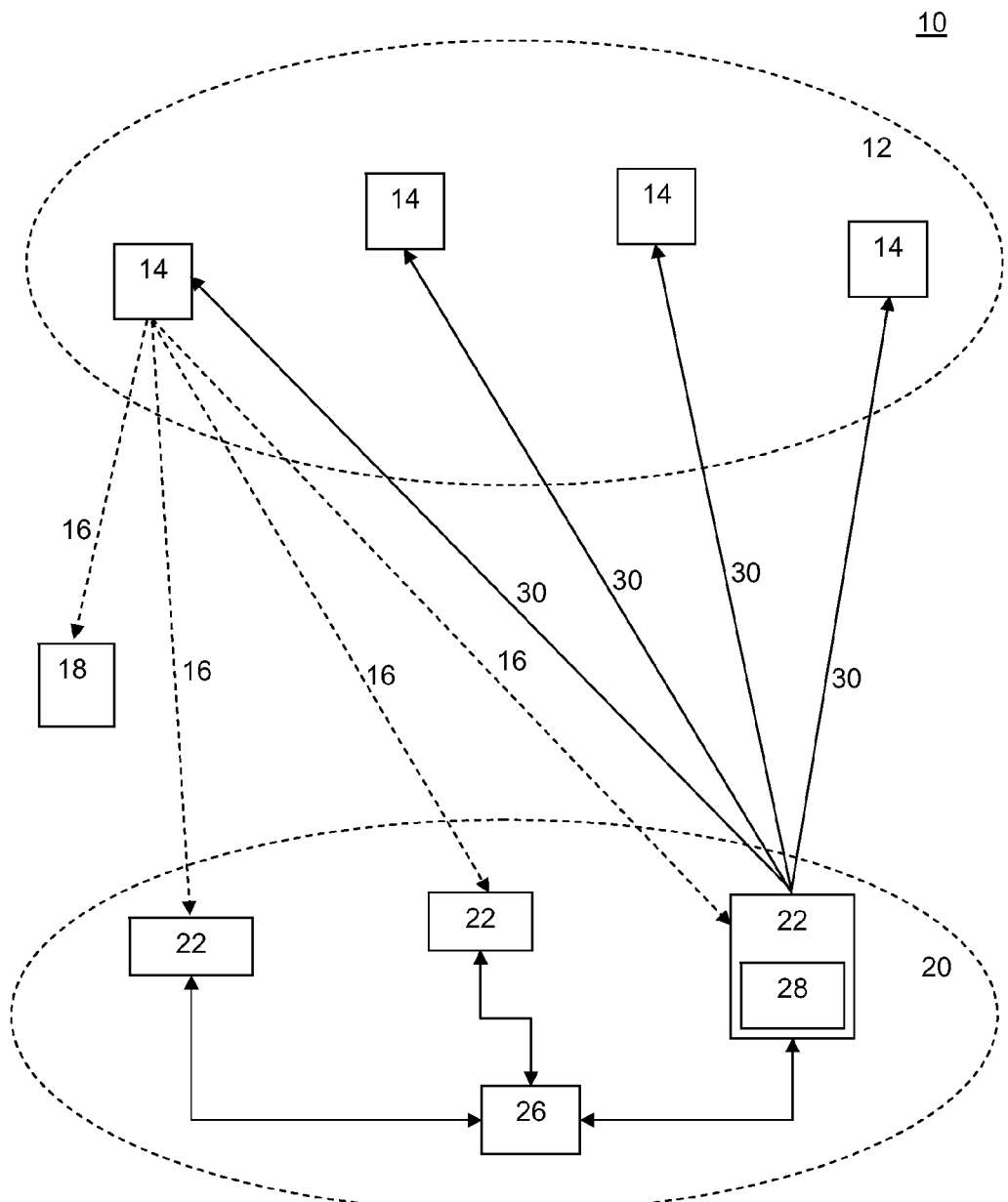
Figure 2:
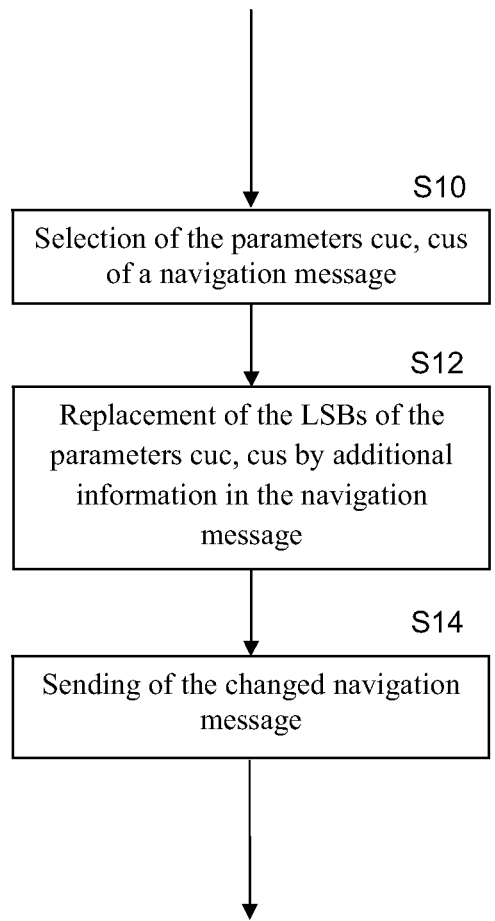

FIG. 1 a satellite navigation system with an embodiment of a device for improving the integrity communication in a satellite navigation system according to the invention; and FIG. 2 a flow chart of an embodiment of a method for improving the integrity communication in a satellite navigation system according to the invention.

Below, the same and/or functionally equivalent elements can be provided with the same reference numerals.

DETAILED DESCRIPTION

FIG. 1 shows a satellite navigation system 10 with a space segment 12 and a ground segment 20. The space segment 12 comprises several satellites 14 that each have their own orbit around the ground segment 20. Each satellite sends satellite signals 16 that can be received by utilizing systems 18 such as, for example, mobile navigation devices as well as by observation and command stations 22 of the ground segment 20. The satellite signals 16 contain navigation messages of the satellite navigation system 10 which, in turn, contain the above-mentioned orbital parameters for describing the orbit.

The observation and command stations 22, which are configured in Galileo as separate units, are especially provided for monitoring and controlling the satellites 14. For this purpose, they relay received navigation signals 16 via a communication network to a control center 26 that evaluates the received navigation signals 16 in that it checks the data from the satellite 14 that is transmitted with each navigation signal 16, especially the orbit and the point in time of the signal generation as well as the signal structure and the integrity of the received signals. The observation and command stations 22 also generate navigation messages 30 and continuously send them to the satellites 14 for purposes of continuous further distribution to the utilizing systems 18.

The navigation messages 30 contain the above-mentioned parameters containing orbital data and, in an observation and command station 22, they can also be provided with additional information that, embedded into the navigation messages, can be transmitted to the utilizing systems 18 via the satellite signals 16, for example, information pertaining to system expansions. For this purpose, an observation and command station 22 has appropriate processor means 26 for generating navigation messages 30. The processor means 26 are configured to execute the method that is sketched in the form of a flow chart in FIG. 2, for example, in that they execute appropriate algorithms.

According to the method sequence sketched in FIG. 2, in Step S10, orbital parameters cuc, cus (or cur, cic, cis) are first selected in a navigation message. Subsequently, in Step S12, the least significant places, i.e. the LSBs of these selected parameters are replaced by information that is to be additionally transmitted and that has nothing to do with orbital data. Finally, in Step S14, the navigation message that has been thus changed is sent by the observation and command station 22, i.e. transmitted to the satellites 14, which transmit the received changed message with its satellite signals 16 in the data stream to the utilizing systems 18.

In order to keep the error introduced into a changed navigation message by the "embedding" of additional information into the orbital parameters as small as possible, especially so small that this error is without relevance for the navigation, it is possible to greatly reduce the periods of time for which the thus changed navigation message is to be used.

Moreover, the processor means 26 can be configured in such a way that the new remaining parameters containing orbital data in the navigation message are each defined in such a way that the deviations in the orbits of the changed navigation message and of the old unchanged navigation message are sufficiently small in the new shorter period of validity of the new changed navigation message.

The period of validity of the new navigation message only has to be just long enough for the message to still meet the requirements of integrity and continuity, or longer than the time until (for example) the at least next but one repetition of the navigation message in the sent data stream of a satellite, which is typically in the order of magnitude of a few minutes, and does not, for example, reach the 110 minutes that are currently provided for.

Here, the new navigation messages do not necessarily have to be sent more frequently by an observation and command station 22 to the satellites 14, since at the points in time when the navigation messages are sent to the satellites, all of the new navigation messages can be sent to the satellites, and the satellites can then store the received navigation messages and send them at a given point in time.

Additional parameters that are possible for a redefinition are the parameters IDOT and OEMEGDOT in the specification of a navigation message in the Galileo system. Incidentally, it is not necessary to also redefine all of the parameters in another meaning.

Through the invention, parts or parameters of an already defined navigation message provided for the orbit, i.e. a navigation message (user message) that is stipulated by a specification, can be used for other purposes. Utilizing systems such as receivers of the navigation messages in the utilization segment of the satellite navigation system that know nothing of this redefinition can process the new data in the old manner and can still receive valid orbits. The new orbital parameters that are sent by the satellite can change more frequently than is the case with the old concept, but this change is transparent for a utilizing system. Utilizing systems or receivers that know about the redefinition can compute the orbit in exactly the same way as before the redefinition, but these utilizing systems can also simultaneously additionally interpret the parameters that have a new additional meaning in the new meaning, since they contain additional information.

REFERENCE NUMERALS 10 satellite navigation system
12 space segment
14 satellites
16 satellite signals
18 utilizing systems
20 ground segment
22 observation and command stations
24 control center
26 processor means for navigation messages 30
28 transmission means
30 navigation message of an observation and command station 22
S10-S14 method steps

The invention claimed is:

1. A method for transmitting additional information in a satellite navigation system comprising:
providing a navigation message having a plurality of parameters;
selecting, using a processor of an observation and command station of a ground segment of the satellite navigation system, at least one parameter containing orbital data of a satellite in the satellite navigation system from the plurality of parameters for the transmitting of the additional information;
replacing, using the processor, at least a portion of the orbital data of the at least one parameter with the additional information so as to form a changed navigation message; and
sending the changed navigation message from the observation and command station to a satellite of a space segment of the satellite navigation system.

2. The method as recited in claim 1, wherein the selecting step includes selecting a parameter containing orbital data of a satellite in the satellite navigation system.

3. The method as recited in claim 1, wherein the satellite navigation system includes the Galileo system, and wherein the at least one parameter includes at least one of cuc, cus, crc, cic, cis, OMEGADOT and IDOT.

4. The method as recited in claim 1, wherein the replacing includes replacing the least significant portion of the at least one parameter.

5. The method as recited in claim 1, further comprising reducing a period of validity of the changed navigation message as compared to a period of validity of an unchanged navigation message such that the changed navigation message meets a precision, integrity, and/or continuity requirement of the satellite navigation system.

6. The method as recited in claim 5, wherein the reducing includes defining an unchanged parameter of the changed navigation message such that a deviation in an orbit of the changed navigation message and a deviation in an orbit of a corresponding unchanged navigation message are sufficiently small.

7. The method as recited in claim 1, further comprising: receiving the changed navigation message; and ascertaining the additional information contained in the at least one parameter.

8. A satellite navigation system comprising:
a space segment including a plurality of satellites each configured to send a satellite signal containing a navigation message;
at least one utilizing system configured to receive and evaluate the navigation message for position determination and navigation; and
a ground segment including a plurality of observation and command stations configured to monitor the plurality of satellites, at least one of the observation and command stations being configured to select at least one parameter containing orbital data of a satellite in the satellite navigation system from a plurality of parameters of the navigation message, to replace at least a portion of the orbital data of the selected at least one parameter with additional information so as to form a changed navigation message; and to send the changed navigation message to at least one of the satellites for transmitting the changed navigation message to the at least one utilizing system.

9. The satellite navigation system as recited in claim 8, further comprising a receiver configured to receive the changed navigation message and to ascertain the additional information contained in the at least one parameter.

* * * * *